(12) United States Patent
Naqvi

(10) Patent No.: US 7,225,234 B2
(45) Date of Patent: May 29, 2007

(54) METHOD AND SYSTEM FOR SELECTIVE ADVERTISEMENT DISPLAY OF A SUBSET OF SEARCH RESULTS

(75) Inventor: Shamim A. Naqvi, Boston, MA (US)

(73) Assignee: Sedna Patent Services, LLC, Philadelphia, PA (US)

(*) Notice: Subject to any disclaimer, the term of this patent is extended or adjusted under 35 U.S.C. 154(b) by 1057 days.

(21) Appl. No.: 09/798,337

(22) Filed: Mar. 2, 2001

(65) Prior Publication Data

US 2002/0143890 A1  Oct. 3, 2002

(51) Int. Cl.
*G06F 15/16* (2006.01)
*G06Q 30/00* (2006.01)

(52) U.S. Cl. .................... 709/217; 705/14

(58) Field of Classification Search ........... 709/203, 709/245, 217–218, 219; 707/9–10; 705/16, 705/26–27, 14; 345/828, 864, 703, 761; 455/456.1–456.3, 457; 715/744–748, 764–765, 715/788
See application file for complete search history.

(56) References Cited

U.S. PATENT DOCUMENTS

| | | | |
|---|---|---|---|
| 5,796,393 A | 8/1998 | MacNaughton et al. | |
| 5,848,397 A * | 12/1998 | Marsh et al. | 705/14 |
| 5,878,233 A | 3/1999 | Schloss | |
| 6,014,651 A | 1/2000 | Crawford | |
| 6,020,884 A | 2/2000 | MacNaughton et al. | |
| 6,091,956 A * | 7/2000 | Hollenberg | 455/456.5 |
| 6,098,065 A * | 8/2000 | Skillen et al. | 707/3 |
| 6,163,316 A | 12/2000 | Killian | |
| 6,177,931 B1 | 1/2001 | Alexander et al. | |
| 6,317,795 B1 | 11/2001 | Malkin et al. | |
| 7,016,892 B1 * | 3/2006 | Kokkonen et al. | 707/3 |
| 2002/0133399 A1 * | 9/2002 | Main | 705/14 |
| 2004/0107125 A1 * | 6/2004 | Guheen et al. | 705/7 |

FOREIGN PATENT DOCUMENTS

WO  WO 00/49801  8/2000

OTHER PUBLICATIONS

A framework for targeting banner advertising on the Internet, Gallagher, K.; Parsons, J.; System Sciences, 1997, Proc. of the Thirtieth Hawaii International Conf. on vol. 4, Jan. 7-10, 1997, pp. 265-274.*

Web advertising, McCandless, M., Lab. for Comput. Sci., MIT, Cambridge, MA, USA; Intelligent Systems and Their Applications, IEEE, May-Jun. 1998, vol. 13, Issue: 3, pp. 8-9.*

Portal Kombat: the battle between Web pages to become the point at entry to the World Wide Web, Dewan, R., et. al., Simon Sch. of Bus., USA; System Sciences, 1999, HICSS-32. Proc. of the 32nd Annual Hawaii Intl. Conf., 1999, vol. Track5, pp. 1-8.*

* cited by examiner

*Primary Examiner*—Beatriz Prieto
(74) *Attorney, Agent, or Firm*—Patterson & Sheridan, LLP

(57) ABSTRACT

A method and system are provided for delivering content items to online users. The content items are to be displayed on user operated devices in response to a specified query. Subsets of items are generated from a set of content items responsive to the specified query. The subsets are selected to generally satisfy delivery requirements associated with each item. A different one of the subsets is delivered to each user making the query.

40 Claims, 4 Drawing Sheets

METHOD AND SYSTEM FOR SELECTIVE ADVERTISEMENT DISPLAY OF A SUBSET OF SEARCH RESULTS

BACKGROUND OF THE INVENTION

1. Field of the Invention

The present invention relates generally to the delivery of content to online users and, more particularly, to a method and system for selective content delivery.

2. Description of Related Art

A vast amount of information is available online, especially over the Internet. Users commonly search for desired information using online search engines. Search engines typically search documents on the Internet for specified keywords and generate a list of the documents having the keywords. The documents are commonly sorted based, e.g., on how well they correlate to the user's query or in some other way such as in alphabetical order. Queries can also be made by clicking on a particular item or category in a list of such items or categories. The sorted results are then returned to the user typically all at once. The user then determines what documents to access by scrolling through the search results.

Scrolling is needed in order to review all of the results, especially in handheld Internet devices, which have small screens with limited display capacities. Scrolling is a tedious and time consuming process as users are typically inundated with large numbers of results. Sorting based on correlating results to user queries is often inaccurate. Accordingly, items at the top of the list of results are often unwarrantedly favored as users typically do not scroll very far down on the results.

A need exists for a method and system for selecting and displaying only a subset of all possible search results at a time with the subset selected based on satisfying some predetermined display requirements associated with the results.

BRIEF SUMMARY OF THE INVENTION

The present invention is directed to a method and system for delivering content items such as advertisements to online users. The content items are to be displayed on user operated devices such as personal computers and mobile Internet devices in response to a specified query. In accordance with the invention, only a subset of all possible items that are responsive to the query are displayed on the user device to avoid the need for scrolling by the user. In accordance with the preferred embodiment, a sequence of subsets is generated with the items for each subset selected in order to generally satisfy given delivery requirements associated with each item. A different one of the subsets in the sequence is delivered in response to successive queries from users until all subsets in the sequence have been delivered. The sequence can then be repeated as needed. The delivery requirements generally indicate how often a content item is to be displayed in response to a specified query relative to the total number of times it could have been displayed or, in other words, the number of times it appears in subsets relative to the total number of subsets.

These and other features and advantages of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF PREFERRED EMBODIMENTS

Figure 1:
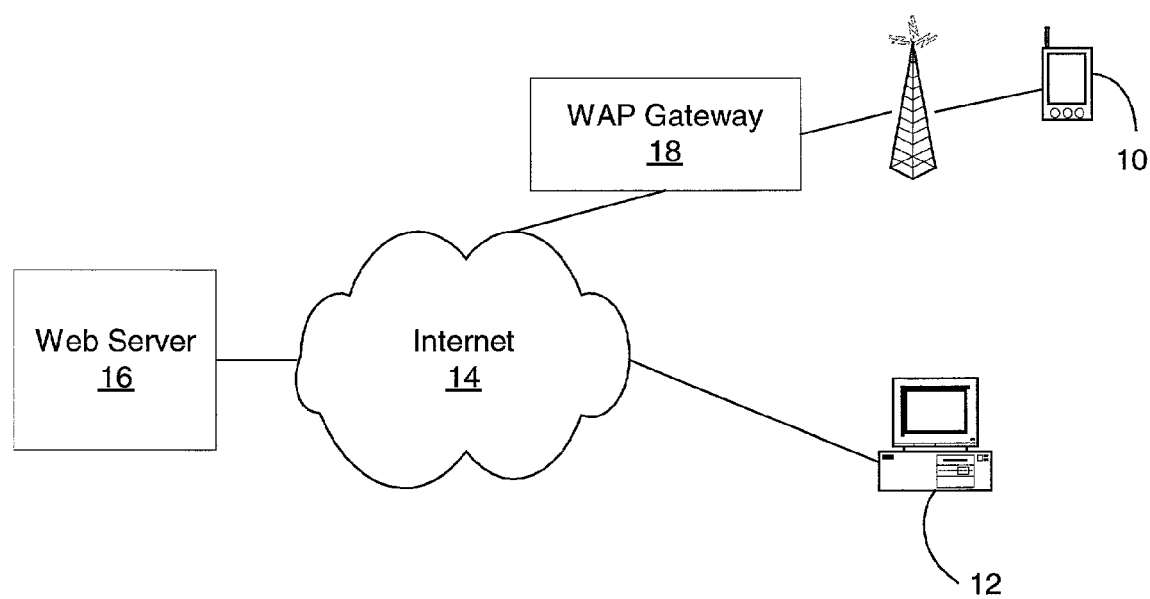
FIG. 1 is a achematic diagram illustrating a representative network in which the inventive system is preferably implemented.

The present invention is directed to a method and system for displaying selected items of content to online users. FIG. 1 illustrates a representative network in which the method and system can be implemented. The network includes various client devices 10, 12 operated by individual users. The client devices 10, 12 connect to a server 16 via a communication channel 14, which is preferably the Internet. (The channel 14 may, however, alternatively comprise an Intranet or other known connections.) In the case of the Internet, the server 16 is one of a plurality of Web servers that are selectively accessible by clients.

A variety of client devices can connect to the server 16. For example, the client device 12 may comprise a personal computer such as a Pentium-based desktop or notebook computer running a Windows operating system. As is well known, a representative personal computer includes a computer processing unit, memory, a keyboard, a mouse and a display unit. The screen of the display unit is used to present a graphical user interface (GUI) for the user. The GUI is supported by the operating system and allows the user to use a point and click method of input, e.g., by moving the mouse pointer on the display screen to an icon representing a data object at a particular location on the screen and pressing on the mouse buttons to perform a user command or selection. Also, one or more "windows" may be opened up on the screen independently or concurrently as desired.

The client device 12 typically includes a browser, which is a known software tool used to access the Web server 16. The Web server 16 operates a so-called "Web site" and support files in the form of documents and pages. A network path to a Web site generated by the server is identified by a Uniform Resource Locator (URL). Representative browsers include, among others, Netscape Navigator and Microsoft Internet Explorer. The client device 12 usually accesses the server 16 through some private Internet service provider (ISP) such as, e.g., America Online.

As is well known, the World Wide Web is the Internet's multimedia information retrieval system. In particular, it is a collection of servers of the Internet that use the Hypertext Transfer Protocol (HTTP), which provides users access to files (which can be in different formats such as text, graphics, images, sound, video, etc.) using, e.g., a standard page description language known as Hypertext Markup Language (HTML). HTML provides basic document formatting and allows developers to specify links to other servers and files. These links include "hyperlinks," which are text phrases or graphic objects that conceal the address of a site on the Web.

A user of the client device 12 having an HTML-compatible browser (e.g., Netscape Navigator) can retrieve a Web page (namely, an HTML formatted document) of a Web site by specifying a link via the URL. Upon such specification, the client device makes a transmission control protocol/Internet protocol (TCP/IP) request to the server identified in the link and receives the Web page in return.

A variety of client devices other than personal computers can also be used. For example, the client device 10 can comprise a variety of typically handheld wireless communications devices such as, e.g., mobile phones, PDAs (personal digital assistants) and other mobile Internet appliances. As is well known, these devices can access Web servers via a WAP (Wireless Application Protocol) gateway 18. WAP is supported by a variety of operating systems, including those particularly engineered for handheld devices. WAP enabled devices commonly run a micro-browser, which is a browser with a small file size that can accommodate the typically low memory constraints of handheld devices and the low-bandwidth constraints of a wireless-handheld network. Although WAP supports HTML and XML (extensible markup language), the WML (wireless markup language, an XML application) is particularly devised for small screens and one-hand navigation without a keyboard. WML is scalable from two-line text displays through larger graphic screens found on devices such as PDAs. The content to be displayed on the handheld devices is stored on a Web server 16 and is accessible via a cellular network and a WAP gateway 18 between the cellular network and the Internet 14.

Mobile Internet appliances 10 typically have small display screens. Often, the content transmitted to those devices is too large to fit into the available display area. For example, there may be a large number of 'hits' in a search engine query, which might not all fit on the available display space. Users can examine the entire result of the search typically by scrolling down the list. Scrolling, however, is generally a tedious and time consuming process. In addition, items at the top of the list may be unwarrantedly favored as users will typically not scroll very far down the list.

This problem also often exists with client devices like personal computers 12, which have larger display screens. Results returned from a search engine queries often do not fit the larger display screens. In addition, the user might choose to have the results displayed on only some small dedicated portion of the display. This could, e.g., be a rectangular area located somewhere on the user's screen. Users may choose to type or otherwise enter a search request within the dedicated space, and have the results also displayed in the space. Because of the small size of the dedicated space, users must typically scroll through search results.

Figure 2:
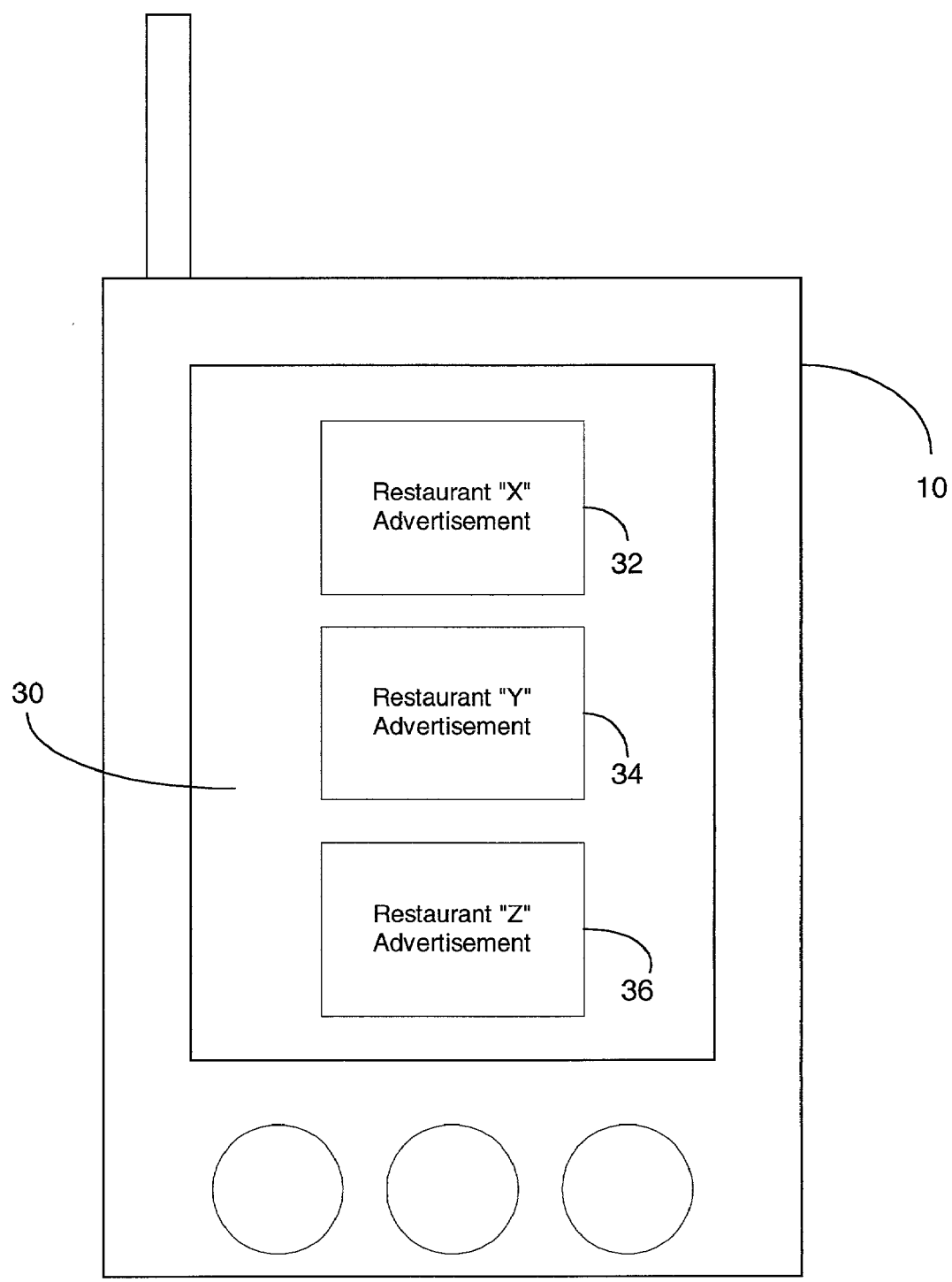
FIG. 2 is a front view of a client device showing an example subset of advertisements displayed.

The inventive system avoids the need for scrolling by transmitting to users only a limited group or subset of items out of a larger group of all possible results responsive to some given query. The limited group of items are then all displayed together at one time on the user's screen. FIG. 2 is an example of a display screen 30 of a handheld Internet device 10 showing three advertisements 32, 34, 36 displayed in prime space in response, e.g., to a query from a user for a restaurant in a given location.

The system determines which items to display at a time in a manner satisfying display requirements associated with those items. If the content item is an advertisement, a display requirement might be specified by the advertiser indicating a certain number of impressions (i.e., the number of times an advertisement is displayed) over a certain time period. These requirements are typically specified in contracts between the advertiser and the content delivery system.

In accordance with the present invention, advertisements are transmitted in a display format in such a way so as to satisfy the requirements of multiple advertisers. In accordance with a preferred embodiment of the invention, the requirements comprise a "relative guarantee," which generally assures the frequently an advertisement is displayed relative to all other possible results. In particular, the requirement specifies a ratio of the number of all cases when the content is shown to the number of all cases when it could have been shown (i.e., when it is a possible result of a query).

For example, a search engine could be used to search a database of restaurants. Users might query the database for restaurants with specific attributes, e.g., entrees less than $30 or a given location. A merchant, say restaurant 'X', may specify, e.g., one or more of the following requirements in a contract with the content delivery system:

1. For 100% of all queries for restaurant 'X', one of the items must be restaurant 'X';

2. For at least 40% of all queries for coffee bars, restaurant 'X' must be displayed; and 3. For at least 30% of all queries for desserts, restaurant 'X' must be displayed.

The relative frequency with which each advertisement can be displayed is, limited by preexisting commitments made to deliver other advertisements and the size of the display area. The available capacity should be considered in contracting with an advertiser to avoid overselling.

Figure 3:
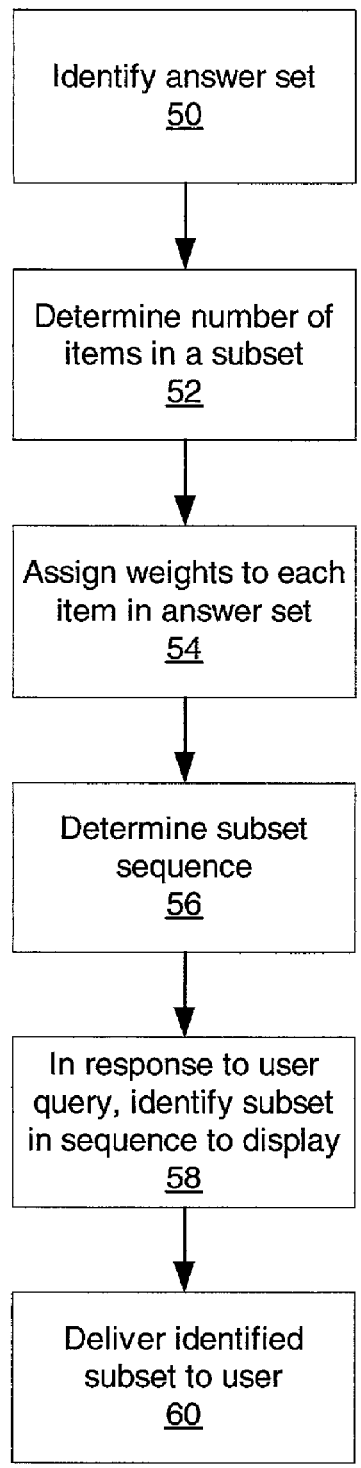
FIG. 3 is a flow chart generally illustrating the process of determining which items of content to display in response to user queries in accordance with the preferred embodiment of the invention.

The system in accordance with the invention determines how content is to be displayed in response to given queries in a manner such that requirements associated with multiple content items are satisfied. FIG. 3 illustrates the general process for scheduling content delivery in accordance with a preferred embodiment of the invention. At step 50, an answer set is determined containing all items responsive to a given query. For example, if a user initiates a search for all restaurants in a given location, the answer set would comprise all advertisements the system has contracted to deliver of restaurants at that location. At step 52, the number of items in a subset is determined. This is generally based on how many items can be reasonably displayed at a time on the user display device. At step 54, weights are assigned to each item in the answer set. The weights correspond to the relative frequency with which the item is required to be displayed. An item required to be displayed more frequently will have a higher weight.

Figure 4:
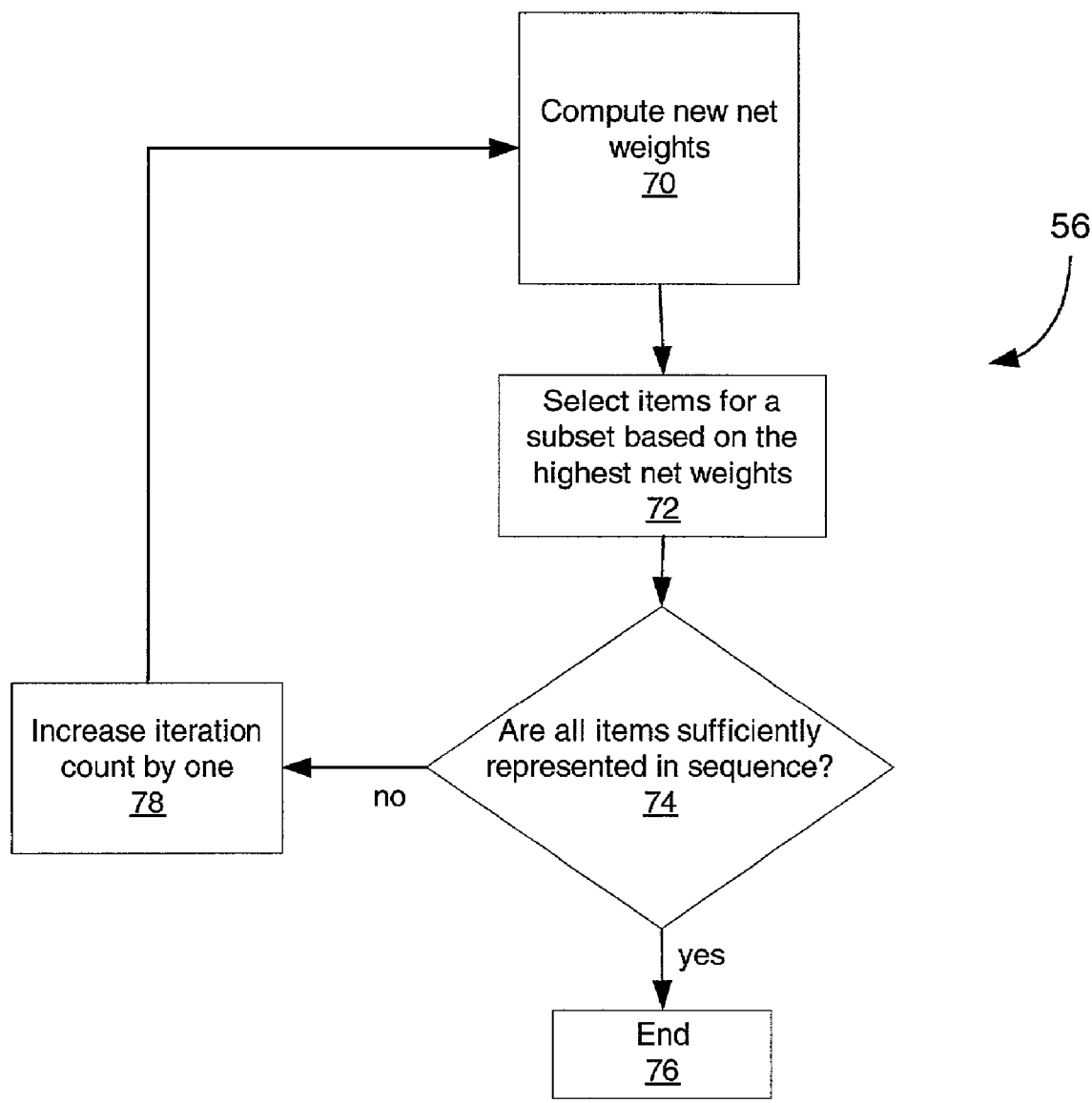
FIG. 4 is a flow chart generally illustrating the process of computing a sequence of subsets in accordance with the preferred embodiment.

Next, at step 56, a list or sequence of subsets is computed. (FIG. 4 illustrates this process in greater detail.) Each subset includes the specified number of items, with the subsets selected to satisfy the display requirements associated with the items. The deviation from the display requirements preferably decreases as the number of queries increases. The system preferably computes sequences with short periods (preferably the minimum possible period) because sequences with smaller periods require less storage space in memory and have lower deviation from display requirements compared to sequences with longer periods.

After the sequence has been computed, at step 58, for each query received from a user, a different subset from the sequence is selected for delivery to the user. The subsets can be selected in order in the sequence. Alternatively, they can be selected in some other manner. For example, the subsets can be numbered beginning with 0. Each query received is also numbered, and the query number is divided by the size of each subset (i.e., the specified number of items in each subset), with the remainder comprising a pointer to one of the numbered subsets in the sequence.

Then, at step 60, the identified subset is delivered to the user.

FIG. 4 illustrates the preferred process for computing the subset sequence in greater detail. The process generates a sequence of subsets based on an input of the answer set, weights assigned to each item in the answer set, and the subset size. In general, a number of iterations are performed, each generating one of the subsets of the sequence. At each iteration, the process selects the items in the answer set that are most underrepresented relative to their weights at that point. The process is repeated until all items are sufficiently represented in the sequence, i.e., the display requirements would be met for all items after all subsets in the sequence are delivered to users.

In FIG. 4, at the first step in each iteration (step 70), a 'net' weight is computed for each item. The net weight comprises the initial weight of the item minus Freq[i]/(n+1), where Freq[i] represents the number of times the item has already been selected for inclusion in a subset, and n is the iteration number. (The first iteration is numbered zero.)

At step 72, the process selects the items in the answer set having the highest net weight for inclusion in a subset. If there is a tie (i.e., multiple items with the same weight), the tie can be broker arbitrarily.

At step 74, the process determines whether all items have been sufficiently represented in the sequence. This is determined by checking to see if each item satisfies a "terminating condition," which is (net weight−Freq[i]/n)>0). Satisfaction of this condition for a given item means that the item in question has been sufficiently considered with respect to its weight. If all items are sufficiently represented, the sequence is complete, and the process ends at 76. If not, the iteration count is increased by one at step 78, and a new iteration is performed beginning again with step 70.

The process is illustrated in the example described below. In this example, the size of a subset is selected to be three, and the answer set includes six items (T1–T6). In the table below, the items are listed in column 1, and their associated initial weights in column 2. Columns 3–7 each indicate the calculations made at each successive iteration. At the first iteration (n=0), a net weight is computed for each of the items by subtracting Freq[i]/(n+1) from the initial weight, where Freq[i] indicates the number of times the item has been selected for a subset and n represents the iteration number. The value of Freq[i]/(n+1) is shown for each iteration in the table, and the net weight at that iteration is shown below it in square brackets. In the first iteration, items T1, T2, and T6, which have the three highest net weights, are selected for the first subset. (In the table, the selected items are indicated by an asterisk.)

More specifically, in the first iteration (n=0), the net weight for item T1 is calculated by subtracting Freq[i]/(n+1) from its initial weight, i.e., 0.6−0/1=0.6. Since the net weight of 0.6 is one of the three highest net weights, it is selected for the first subset. (As previously mentioned, any ties can be broken arbitrarily.) Then, in iteration two (n=1), item T1's net weight is again calculated by subtracting Freq[i]/(n+1) from its previous net weight, i.e., 0.6−1/2=0.1. Since the net weight of 0.1 is not one of the highest three net weights, it is not selected for subset two. The process is then repeated for each item in the subsequent iterations.

| Contract | | Freq[i]/(n + 1) | | | | Freq[i]/n |
|---|---|---|---|---|---|---|
| Item | Weight | n = 0 | n = 1 | n = 2 | n = 3 | n = 4 | n = 5 |
| T1 | 0.6 | 0/1 [0.6]* | 1/2 [0.1] | 1/3 [0.3]* | 2/4 [0.1] | 2/5 [0.2]* | 3/5 |
| T2 | 0.8 | 0/1 [0.8]* | 1/2 [0.3]* | 2/3 [0.2] | 2/4 [0.3]* | 3/5 [0.2]* | 4/5 |
| T3 | 0.4 | 0/1 [0.4] | 0/2 [0.4]* | 1/3 [0.1] | 1/4 [0.15]* | 2/5 [0] | 2/5 |
| T4 | 0.4 | 0/1 [0.4] | 0/2 [0.4]* | 1/3 [0.1] | 1/4 [0.15]* | 2/5 [0] | 2/5 |
| T5 | 0.2 | 0/1 [0.2] | 0/2 [0.2] | 0/3 [0.2]* | 1/4 [−.05] | 1/5 [0] | 1/5 |
| T6 | 0.6 | 0/1 [0.6]* | 1/2 [0.1] | 1/3 [0.3]* | 2/4 [0.1] | 2/5 [0.2]* | 3/5 |

The output sequence selected is [T2, T1, T6], [T3, T4, T2], [T5, T6, T1], [T2, T4], and [T1, T6, T2]. It should be noted that for n=5, the sequence terminates because the terminating condition (net weight−Freq/(n)>0) becomes true. As previously mentioned, once the sequence is computed, as users make queries, subsets from the sequence are selected for display.

The method steps described above can be implemented in a general purpose computer. They are preferably implemented in software, e.g., as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps. Having described preferred embodiments of the present invention, it should be apparent that modifications can be made without departing from the spirit and scope of the invention.

The invention claimed is:

1. A method, comprising:
   receiving a query from a user operated device;
   generating a plurality of search results in response to the query, the search results including a plurality of content items; and
   selectively displaying one of a plurality of subsets of the search results in a sequence on the user operated device to generally satisfy a plurality of requirements, the requirements being associated with each content item and specifying a frequency with which that content item is to be displayed relative to the other content items for a total number of subsets for the search results.

2. The method of claim 1, wherein each subset includes a predetermined number of content items.

3. The method of claim 1, wherein the content items of the subset delivered all simultaneously displayed on a display screen of the user operated device.

4. The method of claim 1 wherein the user operated device comprises a personal computer.

5. The method of claim 1 wherein the user operated device comprises a mobile Internet device.

6. The method of claim 1 wherein the user operated device comprises a personal digital assistant.

7. The method of claim 1 wherein the user operated device comprises a mobile phone.

8. The method of claim 1 wherein said items are delivered to a plurality of users via the Internet.

9. The method of claim 1 wherein the subsets form, a periodic sequence.

10. The method of claim 1 wherein the subsets form a minimally periodic sequence.

11. The method of claim 1, wherein the subsets are organized as a sequence of subsets, and wherein subsets are delivered in order in the sequence in response to at least one successive query.

12. The method of claim 1, further comprising:
performing a plurality of iterations, each iteration generating one of the subsets and comprising items selected on the basis of their display requirements and how well they are represented relative to other items in other subsets.

13. A method comprising:
determining a number of advertisements to be displayed at a time on a user operated device;
determining a set of advertisements that are responsive to a query;
determining a display requirement associated with each advertisement in the set of advertisements;
generating a sequence of subsets from the set of advertisements, the subsets including advertisements selected to generally satisfy a plurality of delivery requirements associated with each of the advertisements; and
delivering a different subset to the user making the query until all of the subsets have been delivered.

14. The method of claim 13, wherein the delivery requirement associated with each advertisement specifies a frequency with which the advertisement is to be displayed relative to other advertisements.

15. The method of claim 13, wherein the delivery requirement associated with each advertisement specifies a number of times that advertisement is to appear in the subsets relative to a total number of subsets in the sequence of subsets.

16. The method of claim 13, wherein the advertisements in a subset delivered to the user are all simultaneously displayed on a display screen of that user's user operated device to avoid the need for scrolling by the user.

17. The method of claim 13 wherein the user operated device comprises a personal computer.

18. The method of claim 13 wherein the user operated device comprises a mobile Internet device.

19. The method of claim 13 wherein the user operated device comprises a personal digital assistant.

20. The method of claim 13 wherein the user operated device comprises a mobile phone.

21. The method of claim 13, wherein the advertisements are delivered to the users via the Internet.

22. The method of claim 13 wherein the subsets form a periodic sequence.

23. The method of claim 13 wherein the subsets form a minimally periodic sequence.

24. The method of claim 13,wherein delivering a different subset comprises delivering subsets in order in the sequence in response to at least one successive query.

25. The method of claim 13 wherein generating a sequence of subsets comprises performing a plurality of iterations, each generating a subset comprising items selected based on their display requirements and how well they are represented in subsets relative to the total number of subsets generated.

26. A computer program product in computer-readable media for performing a method, the method comprising:
means for receiving a query from a user operated device; and
means for generating plurality of search results in response to the query, the search results including a plurality of items; and
selectively displaying one of a plurality of subsets of the search results in a sequence on the user operated device to generally satisfy plurality of requirements, the requirements being associated with each item and specifying a frequency with which that item is to be displayed relative to the other items for a total number of subsets for the search results.

27. The computer program product of claim 26 wherein each subset includes a predetermined number of items.

28. The computer program product of claim 26, wherein the items of the subset delivered to a user are all simultaneously displayed on a display screen of the user operated device.

29. The computer program product of claim 26 wherein the user operated device comprises a personal computer.

30. The computer program product of claim 26 wherein the user operated device comprises a mobile Internet device.

31. The computer program product of claim 26 wherein the user operated device comprises a personal digital assistant.

32. The computer program product of claim 26 wherein the user operated device comprises a mobile phone.

33. The computer program product of claim 26 wherein said items are delivered to a plurality of users via the Internet.

34. The computer program product of claim 26 wherein the subsets form a periodic sequence.

35. The computer program product of claim 26 wherein the subsets form a minimally periodic sequence.

36. The computer program product of claim 26, wherein subsets are displayed in order in the sequence in response to at least one successive query.

37. The computer program product of claim 26, wherein a plurality of iterations are performed, each iteration generating one of the subsets that includes items selected on the basis of their display requirements and how well they are represented relative to other items in other subsets.

38. A system, comprising
at least one processor;
a memory associated with the at least one processors; and
a program stored in the memory for;
receiving a query from a user operated device:
generating a plurality of search results in response to the query, the search results including a plurality of content items; and
selectively displaying one of a plurality of subsets of the search results in a sequence on the user operated device to generally satisfy a plurality of requirements, the requirements being associated with each content item and specifying a frequency with which that content item is to be displayed relative to the other content items for a total number of subsets for the search results.

39. A system comprising at least one processor;

memory associated with the at least one processor; and a program stored in the memory, comprising:

(a) means for receiving a query from a user operated device;

(b) means for generating a plurality of search results in response to the query, the search results including a plurality of content items; and (c) means for selectively displaying one of a plurality of subsets of the search results in a sequence on the user operated device to generally satisfy a plurality of requirements, the requirements being associated with each content item and specifying a frequency with which that content item is to be displayed relative to the other content items for a total number of subsets for the search results.

40. The method of claim 1, wherein the content items include advertisements.

* * * * *

UNITED STATES PATENT AND TRADEMARK OFFICE
CERTIFICATE OF CORRECTION

PATENT NO. : 7,225,234 B2  Page 1 of 1
APPLICATION NO. : 09/798337
DATED : May 29, 2007
INVENTOR(S) : Shamim A. Naqvi It is certified that error appears in the above-identified patent and that said Letters Patent is hereby corrected as shown below:

On the Title Page Item -56-, U.S. Patent Documents, column 2, before "2002/0133399 Al ..." insert --2001/0049620   12/2001   Blasko--

Column 2, line 13, delete "achematic" and insert instead --schematic--.

Column 5, line 38, delete "(net weight-Freq[I]/n)>0)." And insert instead --(net weight-Freq [i]/(n)>0).--

Column 6, line 24, delete "[T2, T4]," and insert instead --[T2, T3, T4],--; line 26, delete "net weight-Freq/(n)>0" and insert instead --(net weight-Freq[i]/(n)>0--; lines 46-49, after "steps." delete "Having described ... of the invention." and insert the same on line 47 as a new paragraph.

Column 7, line 2, in claim 3, after "delivered" insert --are--; line 14, in claim 9, delete "form," and insert instead --form--; line 28 (approx), in claim 13, delete "method" and insert instead --method,--; line 65, in claim 21, delete "users" and insert instead --user--.

Column 8, line 16, in claim 26, after "generating" insert --a--; line 21, after "satisfy" insert --a--; line 58 in claim 38, delete "processors;" and insert instead --processor;--; line 59, delete "for;" and insert instead --for:--; line 60, delete "device:" and insert instead --device;--.

Column 9, line 5, in claim 39, delete "system" and insert instead --system,--.

Signed and Sealed this

Twenty-first Day of August, 2007

JON W. DUDAS
*Director of the United States Patent and Trademark Office*